(No Model.)
T. V. HANDLOSER.
VELOCIPEDE HUB.
No. 553,616. Patented Jan. 28, 1896.
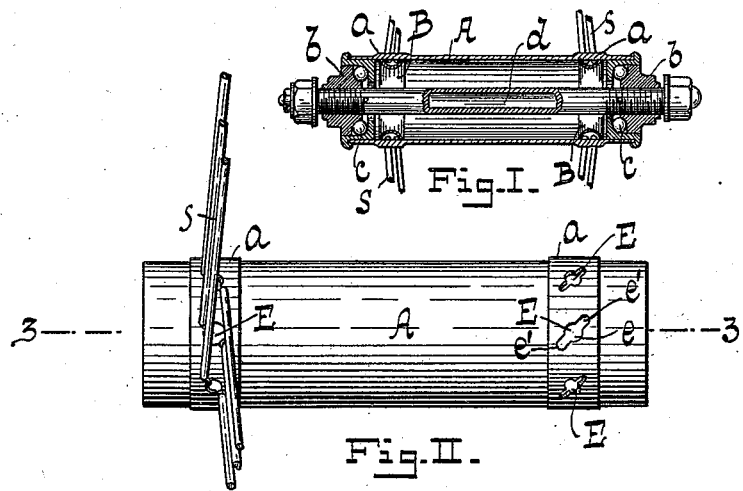
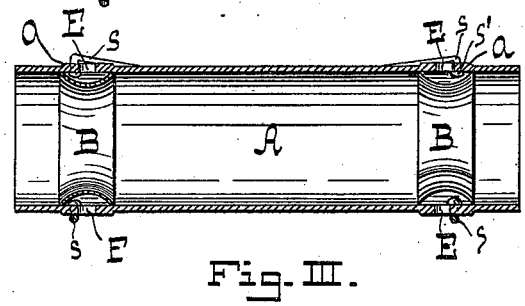
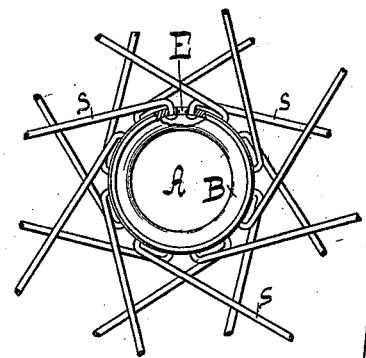
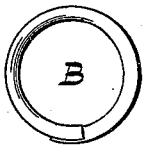
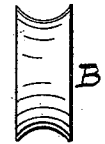
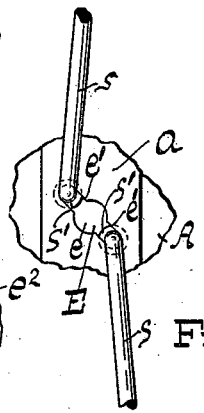
WITNESSES:
INVENTOR:
Thomas V. Handloser,
BY
ATTORNEY

UNITED STATES PATENT OFFICE.

THOMAS V. HANDLOSER, OF NEW YORK, N. Y.

VELOCIPEDE-HUB.

SPECIFICATION forming part of Letters Patent No. 553,616, dated January 28, 1896.

Application filed April 15, 1895. Serial No. 545,676. (No model.)

*To all whom it may concern:*

Be it known that I, THOMAS V. HANDLOSER, a citizen of the United States of America, residing at New York, in the county and State of New York, have invented certain new and useful Improvements in Velocipede-Hubs, of which the following is a specification.

My invention has reference to improvements in means for securing spokes to the hubs of velocipede-wheels, and especially to self-oiling hubs.

It has for its object to simplify the process of applying the spokes in the manufacture of the wheel, as well as to facilitate the replacing of the spokes. Heretofore it has been customary to provide the hub with a collar or flange provided with transverse holes through which the headed spokes were passed, or when the hub was made substantially cylindrical it was provided with peripheral openings through which the headed spokes were passed from the interior of the hub. According to my present invention I provide the hub with a series of slots each consisting of a central entrance-opening large enough to permit the passage of the head of the spoke from the exterior of the hub and lateral contracted portions or necks of less width than the diameter of the head of the spoke. In conjunction with said slots I make use of split dust-guards placed within the hub adjacent to the slots and adapted to prevent the entrance of dust through said slots.

The nature of my invention will best be understood when described in connection with the accompanying drawings, in which—

Figure 1 is a sectional elevation of a self-oiling hub provided with my improved means for attaching the spokes. Fig. 2 is an elevation of the hub drawn on a larger scale. Fig. 3 is a longitudinal section on the line 3 3, Fig. 2. Fig. 4 is an end elevation of Fig 2. Figs. 5 and 6 are detail views of the dust-guard. Fig. 7 is a detail, on an enlarged scale, showing the manner of securing the spokes. Fig. 8 is a side view of a spoke drawn to the same scale as Fig. 7. Fig. 9 is a detail illustrating a modified form for the slot.

Similar letters of reference designate corresponding parts throughout the several views of the drawings.

Referring at present to Fig. 1 of the drawings, the letter A designates a front hub as constructed for a bicycle.

$b$ $b$ are the end caps formed with the usual ball-bearings $c$, and $d$ is the tubular axle adapted to be filled with the lubricant for distribution to the ball-bearings $c$.

The hub A is substantially in the form of a cylindrical sleeve with shoulders $a$ $a$ near its opposite ends for strengthening the same at the portions where the ends of the spokes are applied. In these shoulders are formed series of peripheral slots E E for the purpose of securing the headed ends of the spokes $s$. These slots, which constitute the chief feature of my invention, consist each of a central entrance-opening $e$ equal in diameter to or very slightly larger than the heads $s'$ of the spokes $s$, and two lateral contracted portions or necks $e'$ $e'$, located diametrically opposite and equal in width to the diameter of the wire constituting the spokes. The spoke is applied to the hub by passing the head $s'$ of the same through the opening $e$ and then drawing the same to one side to bring the headed ends within the necks $e'$. The necks $e'$ being of less width than the diameter of the heads $s'$ of the spokes the latter are held to the hub.

To prevent the entrance of dust through the open portions of the slots, I provide dust-guards B B, which are preferably made in the form of split rings, provided with overlapping ends and with concave peripheries. These guards are made of resilient sheet metal or other suitable material and can be readily sprung into place adjacent to the rows of slots in the hub. The concave peripheries receive the heads of the spokes, while the edges of the rings fit quite closely to the inner periphery of the hub.

While I have herein shown each slot E adapted for the reception of two spokes, I do not wish to restrict myself to using two contracted portions or necks, since it is evident that if but one spoke is to be secured in each opening one contracted portion or neck is sufficient. This latter construction I have shown in Fig. 9, $e^2$ being the entrance-opening and $e^3$ the contracted portion or neck.

While I have herein stated that the diameter of the entrance-opening is equal in diameter to or slightly larger than the head of the spoke, the same may be made smaller in diameter than the head of the spoke and the latter passed through the slot edgewise.

What I claim as new is—

1. A hub for velocipedes containing a cylindrical sleeve provided with slots near its opposite ends arranged around the periphery thereof in parallel oblique lines and each containing an entrance opening adapted for the passage of the headed end of the spoke, and two lateral contracted portions or necks of less diameter than the headed ends of the spokes, and dust guards arranged adjacent to said slots and closing off the same, substantially as described.

2. A hub for velocipedes provided with a series of peripheral slots each containing an entrance opening adapted for the passage of the head of the spoke and a lateral contracted portion or neck of less width than the diameter of the headed ends of the spoke, and a split ring having a concave periphery and arranged within the hub adjacent to the slots, substantially as and for the purpose set forth.

3. A dust guard for hubs composed of a split ring with a concave periphery and overlapping ends, substantially as and for the purpose set forth.

In testimony that I claim the foregoing as my invention I have signed my name in presence of two witnesses.

THOMAS V. HANDLOSER.

Witnesses:
ALFRED SIMON,
GEORGE W. BRETTELL.